United States Patent [19]
den Toonder et al.

[11] 4,353,088
[45] Oct. 5, 1982

[54] CODING AND DECODING SYSTEM FOR VIDEO AND AUDIO SIGNALS

[75] Inventors: Pieter den Toonder, Dordrecht; Pieter J. Fondse, Papendrecht, both of Netherlands

[73] Assignee: Oak Industries, Inc., Rancho Bernardo, Calif.

[21] Appl. No.: 149,707

[22] Filed: May 14, 1980

[51] Int. Cl.$^3$ .......................... H04N 7/16; H04K 1/02
[52] U.S. Cl. ..................................... 358/120; 358/118; 358/121; 358/124
[58] Field of Search ................ 358/118, 120, 121, 124

[56] References Cited

U.S. PATENT DOCUMENTS

| | | | |
|---|---|---|---|
| 2,510,046 | 5/1950 | Ellett et al. | 358/120 |
| 2,563,448 | 8/1951 | Aram et al. | 358/121 |
| 2,705,740 | 4/1955 | Druz | 358/120 |
| 3,081,376 | 3/1963 | Loughlin et al. | 358/120 |
| 3,313,880 | 4/1967 | Bass | 358/120 |
| 3,485,941 | 12/1969 | Bass | 358/120 |
| 3,530,232 | 9/1970 | Reiter et al. | 358/120 |
| 4,024,575 | 5/1977 | Harney et al. | 358/118 |
| 4,081,832 | 3/1978 | Sherman | 358/121 |
| 4,095,258 | 6/1978 | Sperber | 358/118 |
| 4,215,366 | 7/1980 | Davidson | 358/124 |
| 4,245,246 | 1/1981 | Cheung | 358/124 |
| 4,295,155 | 10/1981 | Jarger et al. | 358/120 |

FOREIGN PATENT DOCUMENTS

| | | |
|---|---|---|
| 1104177 | 2/1968 | United Kingdom . |
| 1268136 | 3/1972 | United Kingdom . |
| 1505319 | 3/1978 | United Kingdom . |

*Primary Examiner*—S. C. Buczinski
*Attorney, Agent, or Firm*—Kinzer, Plyer, Dorn & McEachran

[57] ABSTRACT

A coding and decoding system for video signals includes means at the transmitter for applying sine wave amplitude modulation of approximate line frequency to the aural carrier to prevent the chrominance subcarrier from providing receiver synchronization.

2 Claims, 13 Drawing Figures

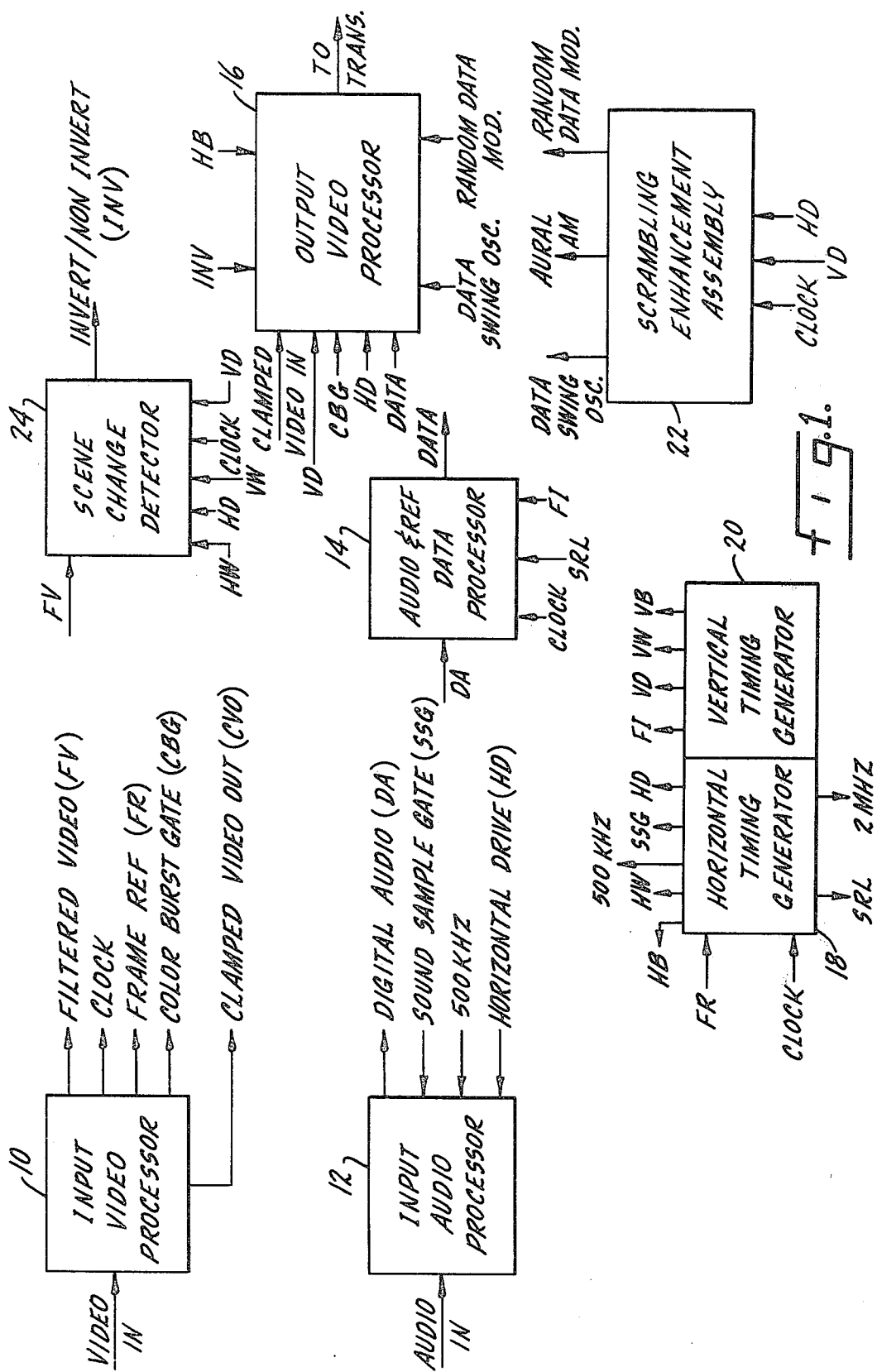

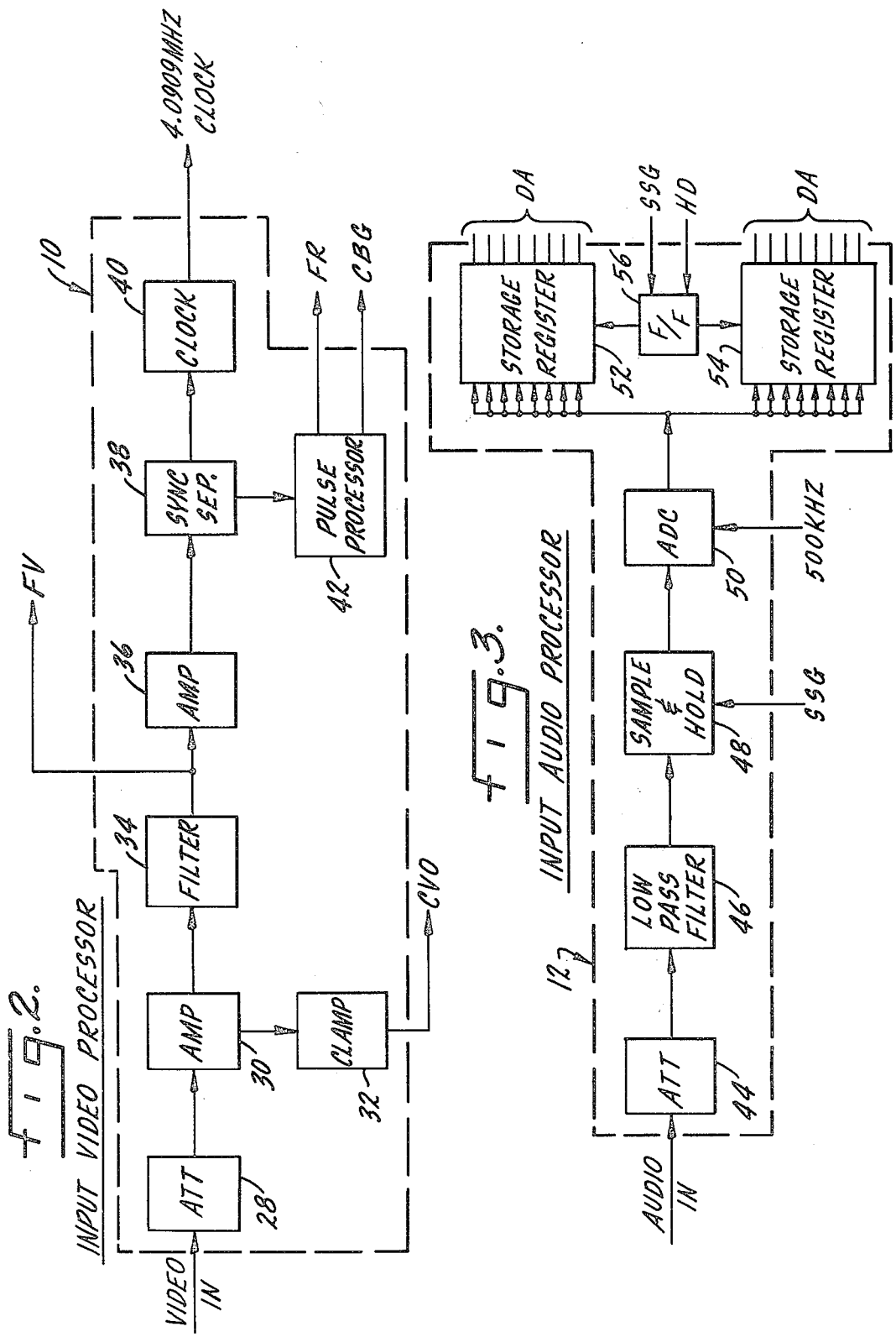

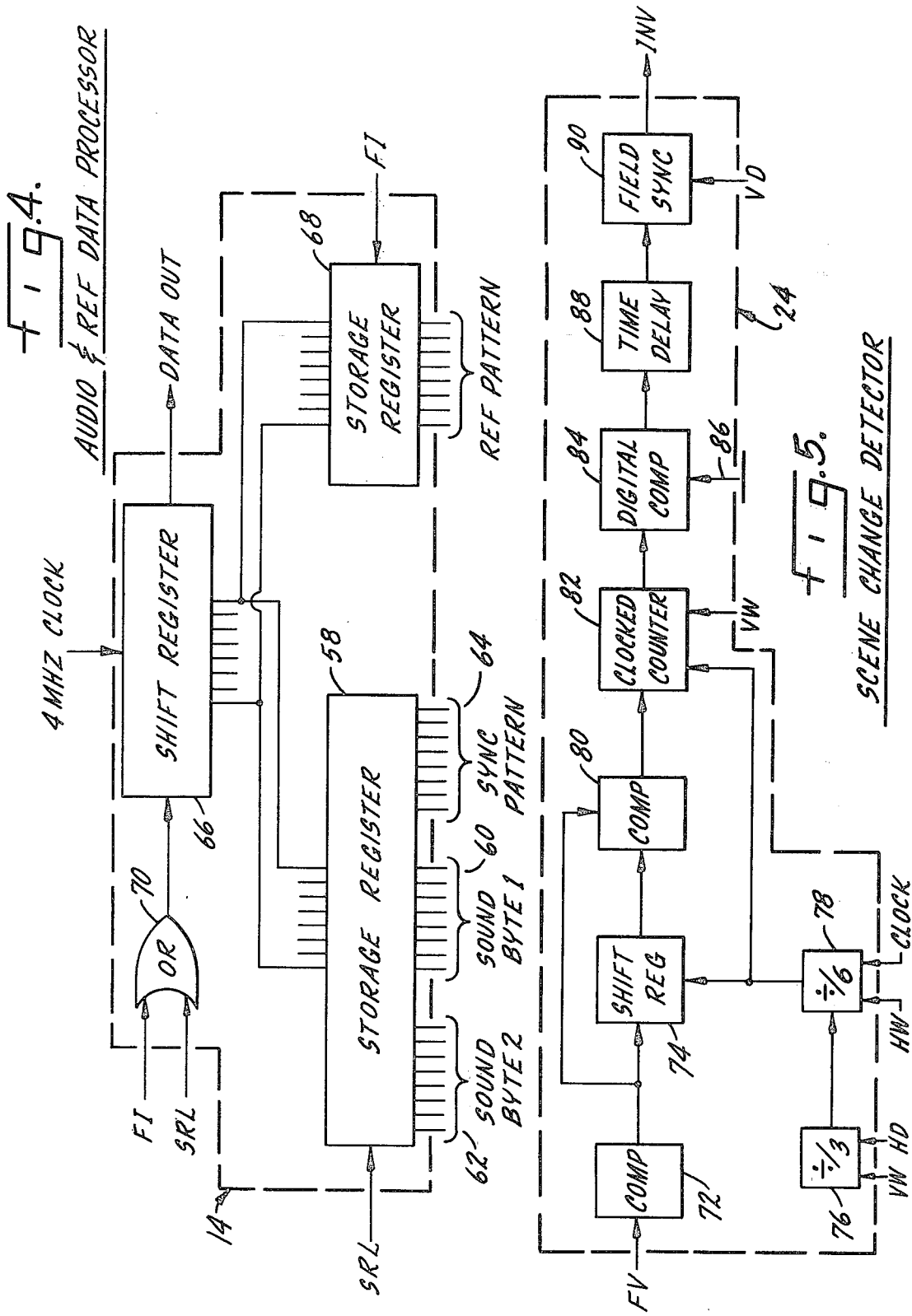

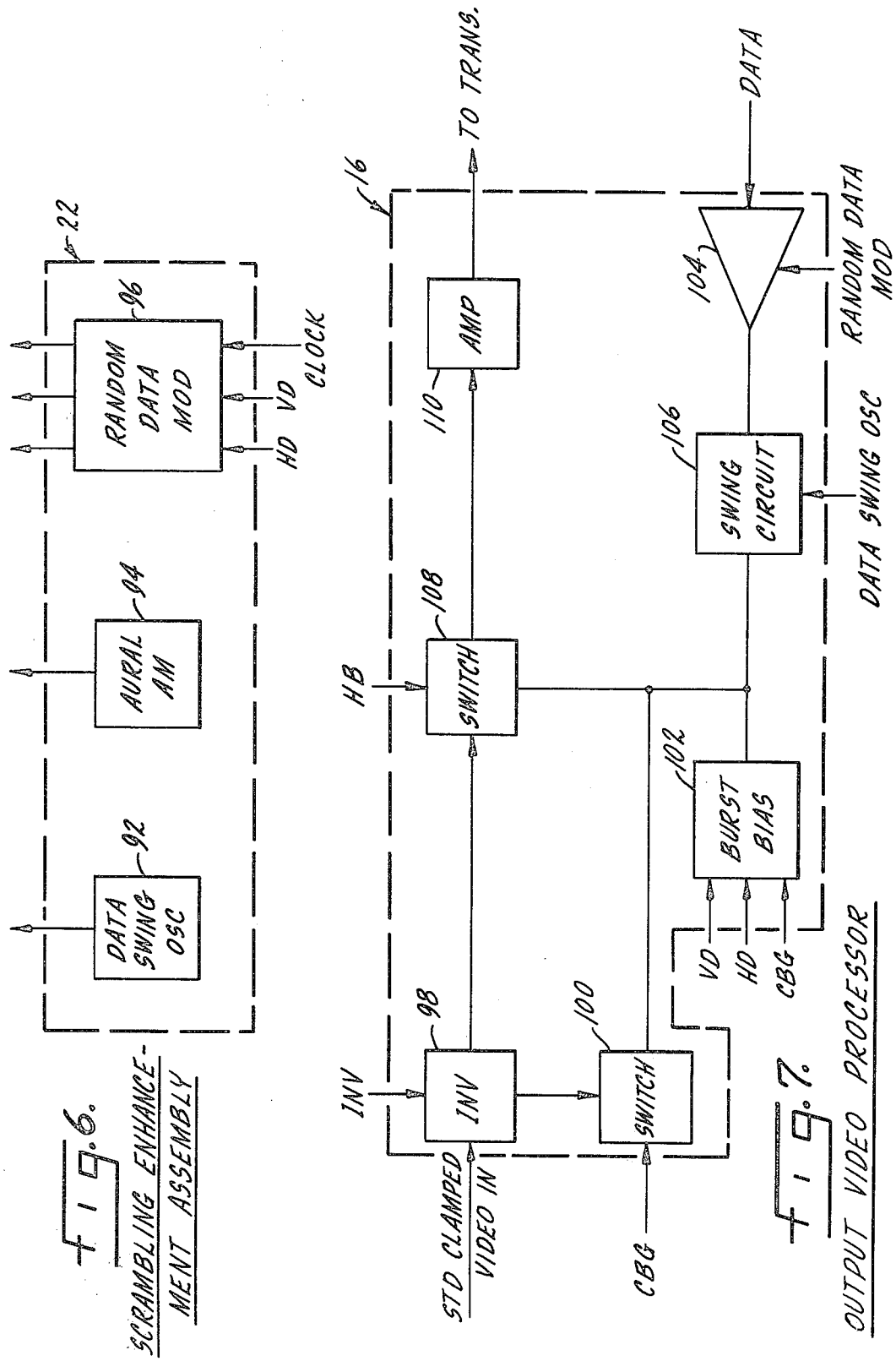

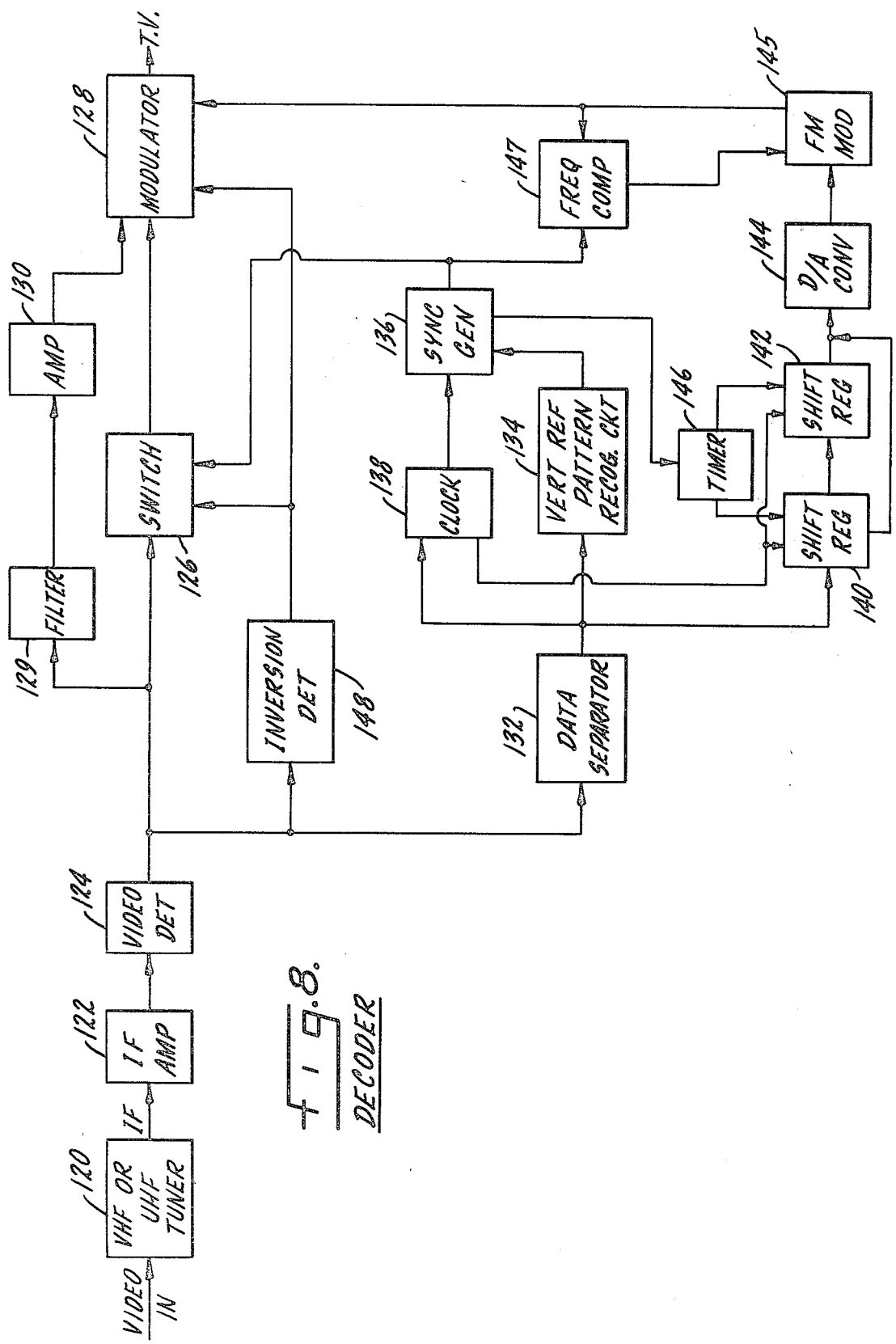
Fig. 8. DECODER

CODING AND DECODING SYSTEM FOR VIDEO AND AUDIO SIGNALS

SUMMARY OF THE INVENTION

The present invention relates to subscription television and in particular to a unique means for coding and decoding both video and audio signals.

A primary purpose is a video coding system of the type described including means for applying sine wave amplitude modulation of approximate line frequency to the aural carrier thereby preventing the chrominance subcarrier from providing receiver synchronization.

Other purposes will appear in the ensuing specification, drawings and claims.

BRIEF DESCRIPTION OF THE DRAWINGS

The invention is illustrated diagrammatically in the following drawings wherein:

FIG. 1 is a diagrammatic illustration of the various functional components which together form an entire audio and video television coding system, FIG. 2 is a block diagram of the input video processor, FIG. 3 is a block diagram of the input audio processor, FIG. 4 is a block diagram of the audio and reference data processor, FIG. 5 is a block diagram of the scene change detector, FIG. 6 is a block diagram of the scrambling enhancement assembly, FIG. 7 is a block digram of the output video processor, and, FIG. 8 is a block diagram of the decoder.

DESCRIPTION OF THE PREFERRED EMBODIMENT

Figure 9:
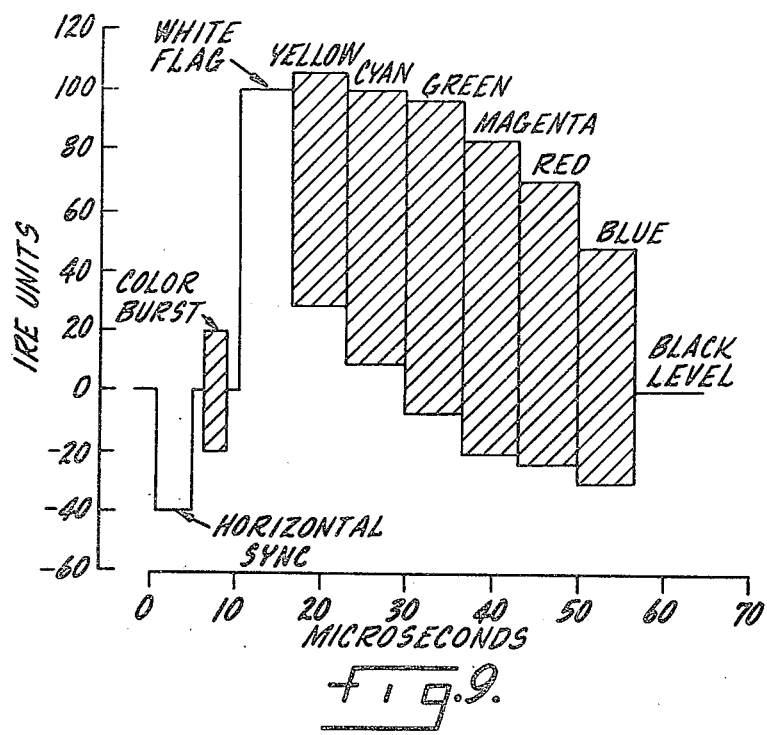
FIG. 9 is a waveform diagram of the standard NTSC video signal illustrating the horizontal sync pulse, burst and the color bars.

The present invention relates to subscription television and in particular to a means for scrambling or encoding or distorting both the video and audio portions of a television signal so that the program has no entertainment value unless the subscriber has the proper decoding equipment. The primary means for encoding is the suppression of all synchronizing information in both the vertical and horizontal blanking intervals as described in co-pending application Ser. No. 965,940 assigned to the assignee of the present application. The sound or audio information is placed in digital form and is inserted in the horizontal blanking interval in place of the normal horizontal sync information. The video may be inverted and this inversion may take place on the basis of program scene changes. Additionally, the video may be distorted by both shifting the voltage level of the digital information in the horizontal interval, as well as by varying the voltage level of this portion of a horizontal line by the application of a sine wave phased to vary the amplitude of the horizontal blanking portion of each line. In order to prevent unauthorized reception of the program which might be accomplished by detuning the receiver approximately one MHz in the direction of the chrominance subcarrier, amplitude modulation is applied to the aural carrier in such a way that chrominance subcarrier video information will not provide synchronization.

In the following description certain signals have designated time relationships and frequencies. It should be understood that the invention should not be limited thereto, but such information is only by way of example.

FIG. 1 diagrammatically illustrates the encoding equipment and FIG. 8 diagrammatically illustrates the decoder. In FIG. 1 the input video processor is indicated at 10 and has an input of base band video (FIG. 9) and outputs of the following signals: a filtered video signal, a 4.0909 MHz clock, a frame reference pulse, a color burst gate signal, and a clamped video output. The use of these various signals will be described in connection with the remaining portions of the circuit.

An input audio processor 12 receives the input audio signal and provides an output of the audio information in digital form. The audio information in digital form is connected to an audio and reference data processor 14 whose output will be data to enable the subscriber decoders as well as the audio information in digital form. The output from processor 14 is directed to output video processor 16 wherein this data is combined with the video signal for subsequent transmission on a suitable carrier. A horizontal timing generator 18 and a vertical timing generator 20 provide various timing signals which coordinate the audio and video processors as well as the operation of a scrambling enhancement assembly 22. A scene change detector 24 has an input of filtered video and an ouput designed to control inversion of the video in output video processor 16 in accordance with program scene changes.

Referring to FIG. 2 which details the input video processor, there is an input attenuator 28 which permits manual adjustment of the vicdeo gain in order to accommodate operating conditions of different video sources. Attenuator 28 is connected to an amplifier 30 which functions as an isolation stage between the video source and the following video processing circuit, as well as providing a small gain (2X) to allow for low amplitude video signals.

A clamp 32 is connected to amplifier 30 and clamps the video signal at a specific level as is common in television operations. The output from clamp 32 is the video signal clamped at an appropriate level which output is passed directly to the output video processor 16 which will be described in detail hereinafter. A filter 34 is also connected to amplifier 30 and is a low pass filter effectively removing all color signals that may interfere with the various following sync separation circuits. The output from filter 34 is thus a low bandwidth monochrome video signal which will be used in scene change detector 24. The output from filter 34 is also connected to a second amplifier 36 whose output in turn is connected to a sync separating circuit 38. One output from sync separating circuit 38 is to a clock circuit 40 which provides a 4.0909 MHz clock signal synchronized with the frequency of the horizontal sync pulses of the incoming video. A pulse processing circuit 42 is also connected to sync separator 38 and provides two outputs. The first, a frame reference signal, is a pulse coincident with the leading edge of the first serration pulse of the vertical interval immediately preceding the odd field. This pulse is required for synchronization of the internal timing signals with the input video. A second output from pulse processor 42 is a color burst gate signal which is coincident with the color burst of each line of the incoming video. The color burst gate will be suppressed during the vertical sync period when no color burst is being received.

Returning to FIG. 1, the horizontal timing generator 18 will have an input of the clock and frame reference signals from video processor 10. The timing generator will provide a number of signals all synchronized by its two inputs. Each horizontal line is divided into 260 parts of approximately 250 NS each. The following table indicates the position of the various timing pulses in a horizontal line. In addition to the pulses of the table, the timing generator will provide an approximate 500 KHz and a two MHz signal for operation of certain of the circuits, as described.

|  | Timing pulse | Start | Stop |
|---|---|---|---|
| SRL | Shift register load | 3 | 4 |
| SS1 | First audio sample | 14 | 33 |
| SS2 | Second audio sample | 144 | 163 |
| HD | Horizontal drive | 9 | 36 |
| HB | Horizontal blanking | 9 | 59 |
| HW | Horizontal window | 60 | 252 |

Vertical timing generator 20 will provide four outputs, the first being the field index signal which will be a very short duration pulse at approximately the middle of the fifth line of the vertical interval (FI); a vertical drive signal, a positive pulse beginning at the first line of the vertical interval and extending to the ninth line of that interval (VD); a vertical blanking signal which is a positive pulse beginning with the initiation of the vertical interval and extending until line 21 of the vertical interval (VB); and a vertical window signal which is a positive pulse beginning at line 46 and extending until line 238 (VW).

FIG. 3 illustrates the input audio processor circuit. The audio signal is directed to an attenuator 44 which functions in a manner similar to attenuator 28 and the output of the attenuator is connected to a low pass filter 46 which limits the pass band to approximately 12 KHz, the audible range. Higher frequency signals would cause distortion in the subsequent digitizing process. A sample and hold circuit 48 is connected to filter 46 and is gated by the sound sample gate signals from horizontal timing generator 18. Circuit 48 will sample the sound during the period that it is gated and will hold the amplitude level of the sound until the next sound sample. As indicated in the previous table, the first audio sample will be made approximately 3.5 microseconds after the start of the horizontal line, with the second audio sample being made approximately 35 microseconds after the beginning of the horizontal line. The sound samples will be converted to digital form by an analog to digital converter 50 which is clocked by a 500 KHz signal from horizontal timing generator 18. Alternate outputs from ADC 50 are connected, in parallel form, to storage registers 52 and 54. The data from the storage registers will be transferred to audio and reference data processor circuit 14 in accordance with the operation of a flip-flop 56. Flip-flop 56 will be gated by the sound sample and horizontal drive (HD) outputs from horizontal timing generator 18. For example, each of the sound samples may be an eight-bit digital word and the samples may be taken at a rate of approximately 31,500 per second.

The digital audio is transferred in parallel form to audio and reference data processor 14 (FIG. 4). A storage register 58 has three sections, one for sound byte 1 (the first sound sample), indicated at 60, a second for sound byte 2 (the second sound sample), indicated at 62, and a third for a digital receiver clock sync pattern, indicated at 64. The sync pattern will be hard-wired into the storage register and will in binary form provide the clock signal for the decoder. The parallel information in storage register 58 will be moved, again in a parallel manner, to a shift register 66 upon being gated by the shift register load pulse from horizontal timing generator 18. A second input for shift register 66 is provided by storage register 68 which has a hard-wired vertical drive reference pattern, which code sequence, again in binary form, is used by the decoder to recognize the existence of an encoded video signal and to reset the decoder time sequence. The field index signal from vertical timing generator 20 is used to move the reference pattern from storage register 68, once each frame, into shift register 66. The data in shift register 66 will be gated to the output video processor in accordance with the presence of either field index or shift register load signals at the input of an OR gate 70 which is connected to shift register 66. The information will be shifted out in accordance with the input four MHz clock signal.

Figure 10:
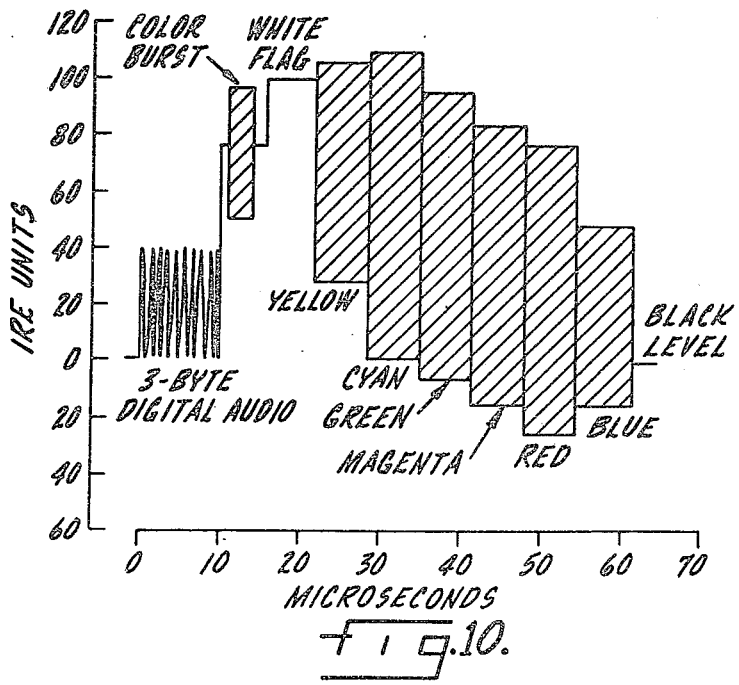
FIG. 10 is a waveform diagram, similar to FIG. 9, but illustrating the replacement of horizontal sync with digitized audio, and a bias applied to the color burst.

FIG. 10 illustrates the three-byte data insertion into the horizontal blanking interval in place of the horizontal sync pulse illustrated in FIG. 9.

As indicated previously, in order to enhance distortion or scrambling of the video signal and to insure that unauthorized receivers cannot in some way view subscription programming, the video is inverted to not inverted in accordance with changes of scene of the actual program. The scene change detector (FIG. 5) has an input of low bandwidth monochrome video from the input video processor and this signal is connected to a voltage comparator 72. Analog comparator 72 compares the instantaneous brightness of the video signal with the average brightness over a period of time, for example three frames. The output from comparator 72 is sampled at a rate of 2,048 samples per field and these samples are stored in shift register 74. In fact, the binary video at the output of comparator 72 is sampled at a rate of 32 samples in one out of every three lines over a period of 192 lines in each field.

This sampling process is controlled by the horizontal and vertical timing generators. A divide by three circuit 76 is clocked by the horizontal drive and reset by the vertical window. The vertical window in addition to resetting the divide by three circuit, thus insuring the same starting point in every frame, also prevents counting and clocks the output of this circuit during the vertical interval. Thus, divide by three circuit 76 produces a pulse during every third line except during the vertical interval. A divide by six circuit 78 is driven by the 4 MHz clock and reset by divide by three circuit 76 and the horizontal window. Accordingly, the divide by six circuit 78 produces output pulses only every third line and only during the horizontal window. Since the horizontal window lasts for 192 clock pulses and divide by six cicuit 78 produces one output pulse for every six clock pulses, there are 32 sample pulses every third line except during the vertical interval.

A digital comparator 80 is connected to the output of shift register 74 and compares the output binary number from shift register 74 with the output binary number from comparator 72. Thus, the brightness level of one field is compared with the brightness level of the preceding field at each of the same locations in the field. The output from digital comparator 80 which will be either high or low, depending upon whether the brightness levels are the same or different, is connected to a clocked counter 82. Counter 82 receives the output from divide circuits 76 and 78 and thus is clocked at the same rate as shift register 74. Clocked counter 82 will count pulses at the described sample rate when the comparator output from circuit 80 is high indicating dissimilar inputs. Thus, whenever there is a difference in the brightness levels from one field to the next, that indication of a brightness change will be registered by clocked counter 82. The counter is reset by the vertical drive signal so that a new count begins for each field. Clocked counter 82 is connected to a digital comparator 84 which has a preset number, as provided by a series of manual switches diagrammatically indicated at 86. Thus, the threshold for recognition of a scene change can be varied. The number from clocked counter 82, when it exceeds the number provided by preset switches 86 is indicative of a scene change as there have been a sufficient number of changes in the brightness level from one field to the next to indicate a scene change. The output from digital comparator 84 is a pulse indicating that in fact a scene change has taken place and this pulse is connected to a time delay 88. Time delay 88 may typically have a three second period and thus will not register a new scene change unless three seconds have elapsed. In this way, fast moving objects or the like will not trigger a polarity change. Time delay circuit 88 is connected to a field sync circuit 90 which is gated by the vertical drive signal from vertical timing generator 20. Thus, a scene change, which will cause inversion or a change of polarity of the video signal as described, will only take place at the end of a field and such inversion will not take place at a greater frequency than every three seconds. The scene change detector output of field sync 90 is connected to output video processor 16.

Figure 11:
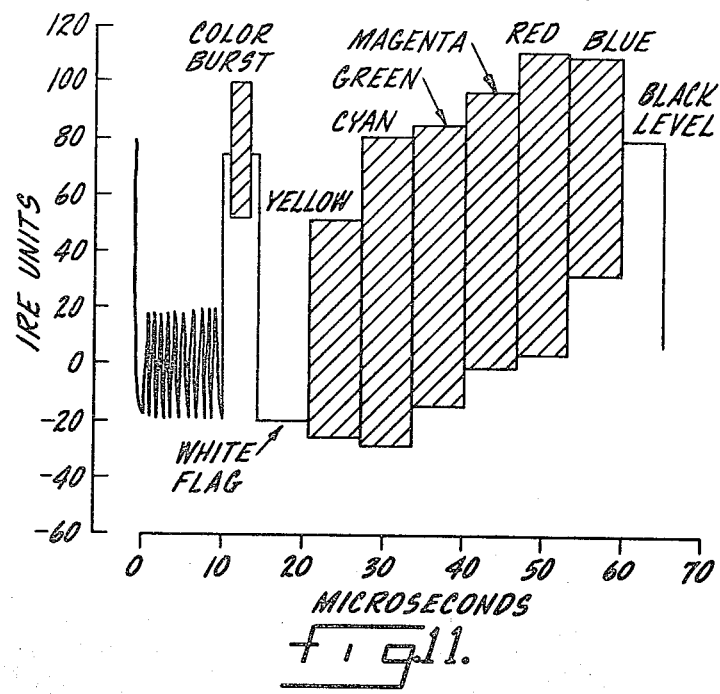
FIG. 11 is a waveform diagram illustrating the scrambled video signal of FIG. 10 with video polarity reversed, except for the color burst.

FIG. 6 illustrates certain circuits which can be utilized to further enhance the scrambling of the video signal. A data swing oscillator 92 is a free running generator oscillating at a frequency of for example approximately 15 Hz. This variable signal will be applied to the data to vary the level thereof at the output of video processor 16. The second circuit in scrambling enhancement assembly 22 is an aural amplitude modulating oscillator 94 which provides a frequency of approximately 15.75 KHz, which frequency will be varied approximately 15–30 Hz on either side of the base frequency. Such a swept frequency will be applied to the aural carrier at the transmitter. Such modulation on the aural carrier will cause it to interfere with the reception of the chrominance subcarrier, thus distorting any information on it and preventing an authorized subscriber from being able to obtain chrominance information which might in fact provide a usable picture. A third signal in scrambling enhancement assembly 22 is provided by a random data modulator 96. This circuit has inputs of horizontal drive, vertical drive, and the four MHz clock. Modulator 96 has three outputs, only one of which will be high during each horizontal drive period. The pattern as to which of the three outputs will be high will only be repeated after approximately 65,000 patterns. The horizontal drive pulsr gates the circuit into operation and the vertical drive pulse will advance the sequence one step. The sequence is continually changing at the vertical drive rate of 60 Hz, FIG. 7 illustrates the output video processor. An inverter is indicated at 98 and receives one input from scene change detector 24 and a second input of the standard clamped video from input video processor 10. Inverter 98 will either reverse the polarity of the video signal or not depending upon the output from scene change detector 24. The scrambled non-inverted video signal is illustrated in FIG. 10 and the scrambled inverted video signal is illustrated in FIG. 11. The video signal as applied to inverter 98 is also applied to a switch 100 which will normally block the video signal except during the period of the color burst as controlled by the color burst gate signal applied from input video processor 10. Thus, the output from switch 100 will be the video color burst. A burst bias circuit 102 has inputs of vertical drive, horizontal drive and the color burst gate. The burst bias circuit, when gated by the color burst gate and not inhibited by either the vertical drive or horizontal drive signals, will provide a DC level or bias voltage for the color burst but will not bias the data. Burst bias circuit 102 is connected to the output of switch 100 so as to provide the bias for the color burst signal. Compare the color burst signal in the unscrambled waveform of FIG. 9 and the scrambled waveform of FIG. 10.

Figure 12:
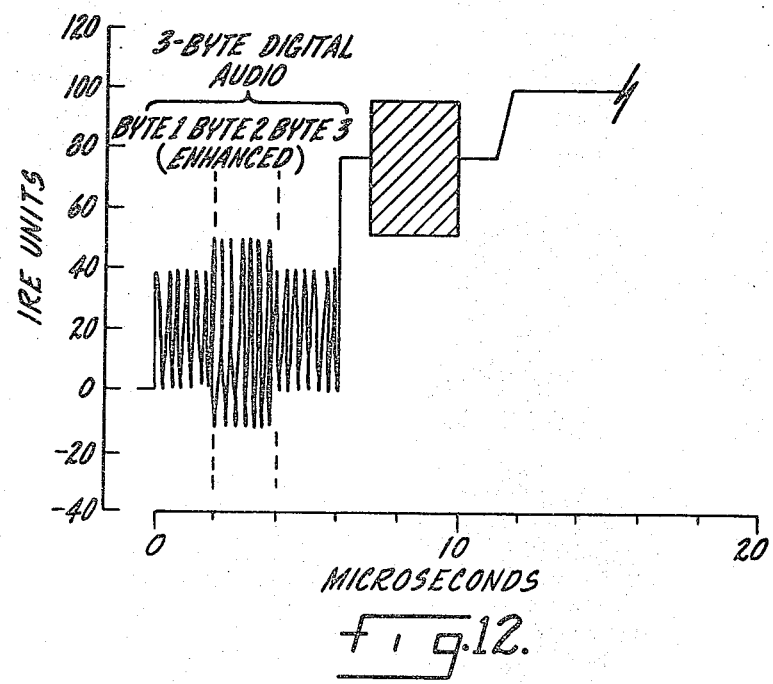
FIG. 12 is a waveform diagram illustrating the instantaneous effect of amplitude modulation applied to the three data bytes.
Figure 13:
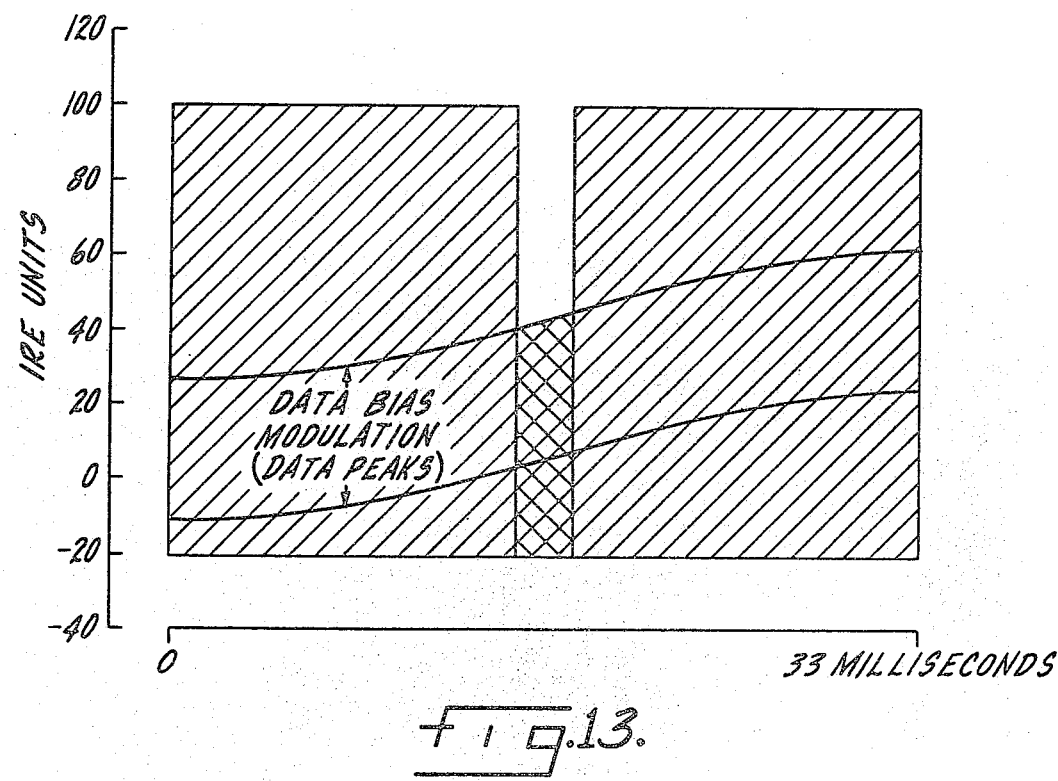
FIG. 13 is a diagrammatic illustration of the application of a low frequency sine wave to a video signal frame.

The data information from audio and reference data processor 14 provides one input to an amplifier 104 whose gain is controlled by the three outputs from random data modulator 96. Thus, which of the three data bytes will have an enhanced amplitude is determined by which output is high from modulator 96. FIG. 12 illustrates one of the three data bytes with an enhanced amplitude. The output from amplifier 104 is connected to a swing circuit 106 which receives the output from data swing oscillator 92. The three data bytes, in addition to having one of the three enhanced in amplitude, will in total have their bias level varied in accordance with the 15 Hz signal from oscillator 92. FIG. 13 diagrammatically illustrates the effect of the 15 Hz signal on a single frame of the video signal. The output from swing circuit 106 is connected to switch 108 as are the outputs from switch 100 and burst bias 102. Switch 108 normally passes the video signal from inverter 98. However, during the horizontal blanking interval, as determined by the horizontal blanking gate applied to the switch, the switch will pass the inputs from swing circuit 106, burst bias 102 and switch 100. Thus, in the horizontal blanking interval, the output from the switch will be the three data bytes enhanced as described and the color burst, all at a predetermined bias level. The output from switch 108 is connected to an amplifier 110, with the output from the amplifier going to the transmitter.

The output from amplifier 110 is a video signal with all horizontal and vertical sync information removed, which video signal will be polarity inverted or not, depending upon changes in scene of the actual picture.

The horizontal blanking interval will be filled with sound data bytes and the conventional color burst as well as the receiver clock sync pattern which is used to control the clock of each decoder. During the vertical blanking interval, the vertical drive reference pattern will be inserted, which enables the decoders to recognize the existence of an encoded video signal. The data in the blanking interval will vary, as described, as effected by the data swing oscillator and the random data modulator. Such variations of signals during the horizontal blanking interval will make it impossible for the receiver to sync onto any repetitive signals in the blanking intervals, thus preventing a usable picture at a non-authorized receiver. Not only is the conventional sync information removed from the video signal, but the information or signals substituted in the horizontal and vertical blanking intervals will prevent the receiver from attaining any synchronization. The polarity reversal caused by scene changes is essentially impossible of detection for anyone not having information as to the switch setting used in digital comparator 84.

The decoder is illustrated in FIG. 8. Typically, subscription programs will be carried on either a UHF or VHF station and such programs wll only be broadcast during a portion of the station's overall air time. The input for the decoder is a UHF or VHF tuner 120 which provides an output IF signal, for example at frequencies of 41.25 MHz and 45.75 MHz, respectively. Although the program audio is coded, the audio carrier may in fact be used for other purposes, such as additional sound, or as a barker channel. The output from tuner 120 is connected to an IF amplifier 122 whose output is connected to a video detector 124 which provides base band video and a 4.5 MHz audio carrier.

Assuming first that a non-encoded program is being received, the video information will pass through a a switch 126 directly to a modulator 128 which will provide an output usable in a TV receiver. The audio signal will pass through a filter 129 and an amplifier 130 whose output is also connected to modulator 128. In the commercial mode the entire program of both audio and video will pass in the conventional manner. The decoder will have no effect upon either signal.

Assuming now that a program is encoded, the output from video detector 124 is connected to a data separator 132 which provides an output with three different types of information. In effect, the data separator provides a signal which allows the vertical reference pattern detector 134 to recognize the existence of coded video and provides a reset pulse for sync generator 136. Sync generator 136 will provide the complete series of horizontal and vertical sync pulses necessary to properly control the video information so that it may be recognizably displayed on a TV receiver. There will be a horizontal drive signal, a vertical drive signal, a composite sync signal and a composite blanking signal. Sync generator 136 is controlled by a clock 138 which is synchronized by the sync pattern which has been transmitted as one of the three data bytes in the horizontal blanking interval. This clock signal will properly regulate the operation of the sync generator as gated by the vertical pattern recognition circuit.

The third output from data separator 132 is the audio information in the form of the two data bytes. This information is passed to a first shift register 140 and a second shift register 142 whose outputs are both connected to a digital-to-analog converter 144 whose output is the audio information in analog or conventional audio form. The operation of the shift registers are controlled by clock 138 and by a timer 146 which is gated by the horizontal drive output from sync generator 136. The timer provides an internally generated clock which consists of two 15.734 KHz signals of opposite phase which alternates operation of the shift registers and is gated or controlled as described by the horizontal drive signal. The data goes into the two shift registers in serial form and comes out in a parallel manner where it is converted by the digital-to-analog converter into conventional audio information.

The output from digital-to-analog converter 144 goes to an FM modulator 145 which will provide the conventional FM signal normally associated with a television program. The output from FM modulator 145 is connected to modulator 128 and to a frequency comparison circuit 147. The basis for frequency comparison is the horizontal drive signal which will be at a very specific 15.734 KHz. This is compared with the FM carrier of 4.5 MHz divided by 286 and any difference is used to control the FM modulator so that it stays precisely on frequency.

An inversion detector 148 is also connected to the output of video detector 124 and the presence of an inverted video signal may, for example, be determined by the level of line 23 in the vertical blanking interval. The manner in which a video inversion control signal is transmitted to a receiver may vary. Such a signal may occupy a portion of a horizontal line in the vertical interval or it may be transmitted with address information in the manner shown in U.S. Pat. Nos. 4,145,717 and 4,112,464. The output from inversion detector 148 is connected directly to modulator 128 where it is effective to cause inversion of the video signal in accordance with inversions of that signal at the transmitter.

Switch 126 receives all of the necessary sync information from sync generator 136. This switch will pass the video signal except as it is gated during the horizontal and vertical blanking intervals to pass only the sync information from sync generator 136. Thus, the output from switch 126 will be the video signal as transmitted with the proper synchronization information inserted therein, which output will subsequently either be inverted or not, depending upon the condition of inversion detector 148. In the case of a signal inversion, the sync will also have to be inverted, which function is also performed by switch 126.

As indicated above, the video signal has been reconstituted by the addition of the sync information deleted at the transmitter. The video signal is inverted or not in accordance with the output of the inversion detector. The audio information is detected, converted to an analog form and placed on a controlled FM carrier. The decoder or data separator ignores the varying level of the three data bytes, as brought about by the data swing generator and similarly ignores any enhancement of one of the three data bytes as controlled by the random data modulator. This is brought about by appropriate bias control in the data separator. However, a receiver without an appropriate decoder cannot ignore such variations in signal level during the horizontal blanking intervals and, as described, will be unable to sync on any repetitive signal.

The vertical reference pattern recognition circuit is arranged to recognize the binary reference pattern as provided by storage register 68 in the audio and reference data processor. As indicated above, such recognition effectively permits the decoder to operate in the manner described.

We claim:

1. Means for coding video and audio signals including:

(a) means for suppressing synchronizing information during video horizontal blanking intervals, (b) means for inserting digital sound data and decoder clock data into the suppressed horizontal blanking intervals, (c) and means for applying sine wave amplitude modulation of approximate line frequency to the aural carrier to prevent the chrominance subcarrier from providing receiver synchronization.

2. The coding system of claim 8 further characterized in that said sine wave amplitude modulation has a center frequency of 15.75 KHz and frequency variation therefrom on the order of about ±30 Hz.

* * * * *